United States Patent
Tuck, III (10) Patent No.: US 6,578,083 B2
(45) Date of Patent: *Jun. 10, 2003

(54) METHOD FOR MONITORING DATA FLOW AT A NODE ON A NETWORK FACILITATING DATA TRANSFER ON AT LEAST ONE LINK HAVING AT LEAST ONE CLASS OF SERVICE

(75) Inventor: Russell R. Tuck, III, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/092,273

(22) Filed: Mar. 4, 2002

(65) Prior Publication Data

US 2002/0152306 A1 Oct. 17, 2002

Related U.S. Application Data

(63) Continuation-in-part of application No. 09/234,082, filed on Feb. 5, 1999, now Pat. No. 6,381,649.

(51) Int. Cl.[7] .......................... G06F 15/16; H04L 12/56
(52) U.S. Cl. ..................... 709/235; 709/224; 709/232; 709/223; 370/230; 370/232; 370/233; 370/235
(58) Field of Search ................................ 709/235, 224, 709/232, 223; 370/230, 232, 233, 235

(56) References Cited

U.S. PATENT DOCUMENTS

| | | | | |
|---|---|---|---|---|
| 4,942,515 A | * | 7/1990 | Marzucco et al. | 710/22 |
| 5,128,924 A | * | 7/1992 | Le Bihan | 370/232 |
| 5,315,587 A | * | 5/1994 | Kullander | 370/235 |
| 5,542,047 A | * | 7/1996 | Armstrong | 709/224 |
| 5,590,366 A | * | 12/1996 | Bryant et al. | 370/232 |
| 5,604,866 A | * | 2/1997 | Kolb et al. | 370/235 |
| 5,649,107 A | * | 7/1997 | Kim et al. | 370/232 |
| 5,787,071 A | * | 7/1998 | Basso et al. | 370/231 |
| 5,862,337 A | * | 1/1999 | Gray | 370/229 |
| 5,936,939 A | * | 8/1999 | Des Jardins et al. | 370/229 |
| 6,006,270 A | * | 12/1999 | Kobunaya | 370/231 |
| 6,061,725 A | * | 5/2000 | Schwaller et al. | 370/230 |
| 6,170,022 B1 | * | 1/2001 | Linville et al. | 370/227 |
| 6,208,619 B1 | * | 3/2001 | Takeuchi | 370/229 |
| 6,222,822 B1 | * | 4/2001 | Gerardin et al. | 370/230 |
| 6,252,848 B1 | | 6/2001 | Skirmont | |
| 6,381,649 B1 | | 4/2002 | Carlson | |

* cited by examiner

Primary Examiner—Krisna Lim
(74) Attorney, Agent, or Firm—Donald R. Boys; Central Coast Patent Agency, Inc.

(57) ABSTRACT

An apparatus and method for monitoring data flow at a node on a network are disclosed. A memory location or "bucket" is allocated to each of a plurality of links and classes of service at the node. A free-running counter is incremented at a rate determined by the maximum allowable data rates on the various links and classes of service. When a data packet is received at a particular link and class of service, the corresponding memory location or bucket is adjusted or "leaked" by subtracting the present counter value from the present bucket contents. That difference is then added to the number of units of data, i.e., bytes or groups of bytes of data, contained in the incoming packet. That sum is then compared with a predetermined threshold determined by the allowable data rate associated with the link and class of service. If the threshold is exceeded, then the incoming data packet is marked accordingly. The system can include multiple stages of monitoring such that multiple thresholds can be used to assign one of multiple discard eligibility values to the incoming packet.

2 Claims, 5 Drawing Sheets

METHOD FOR MONITORING DATA FLOW AT A NODE ON A NETWORK FACILITATING DATA TRANSFER ON AT LEAST ONE LINK HAVING AT LEAST ONE CLASS OF SERVICE

CROSS-REFERENCE TO RELATED DOCUMENTS

This application is related to U.S. Pat. No. 6,252,848 by inventor David Skirmont, issued Jun. 26, 2001, which is incorporated herein in its entirety by reference, and is a continuation-in-part to co-pending patent application Ser. No. 09/234,082, filed Feb. 5, 1999, also incorporated in its entirety by reference.

FIELD OF THE INVENTION

This invention relates generally to the field of digital communications and more particularly to systems and methods for switching packets of data in a switching node used in a digital data network and for monitoring data flow at the switching node.

BACKGROUND OF THE INVENTION

Digital networks have been developed to facilitate the transfer of information including data and programs among digital computer systems and numerous other types of devices. A variety of types of networks have been developed and implemented using diverse information transfer methodologies. In modern networks, information is transferred through a mesh of switching nodes which are interconnected by communication links in a variety of patterns. The mesh interconnection pattern can allow for a number of paths to be available through the network from each computer system or other device to another computer system or other device.

Information transferred from a source device to a destination device is generally transferred in the form of fixed or variable-length data packets, each of which is in general received by a switching node over a communication link and transmitted over another communication link to facilitate transfer of the packet to the destination device or to another switching node along a path to the destination device. Each packet typically includes address information including a source address that identifies the device that generated the packet and a destination address that identifies the particular device or devices which are to receive the packet.

Typically, a switching node includes one or more input ports, each of which is connected to a communication link on the network to receive data packets, and one or more output ports, each of which is also connected to a communication link on the network to transmit packets. Each node typically also includes a switching fabric that couples data packets from the input ports to the output ports for transmission.

Typically, a network service provider maintains and operates one or more switching nodes which can transfer data packets from input communication links across the switching fabric to output communication links. These providers charge fees to customers who use the links to transfer data across the nodes on the network. Typically, the fees are related to the maximum data rate at which a customer can expect data to be forwarded across the node.

Each link at a node is typically assigned at least one "class of service" which is related to a maximum allowable data rate provided to a customer that uses the link, which in turn is based upon the fee paid by the customer to the provider. In many cases, each link can be assigned multiple classes of service associated with a single user or multiple users.

It is in the interest of service providers to monitor or "police" data traffic on each link to determine whether customers' use of their allocated links is within contractual limits. Where it is determined that the use of the link, i.e., the data rate, exceeds the contractual limit, data packets can be identified and marked as such, i.e., as being "out of contract." In many cases, it is important to carefully monitor data traffic on each link at each class of service. It is also often desirable to mark data packets with respect to the degree to which a particular packet may be out of contract. For example, if a particular packet is only slightly out of contract, it may be desirable to mark the packet as such. Also, in cases of extreme overuse of the link, it may also be desirable that data packets be so marked.

In some systems, the degree to which a packet exceeds the link contract data rate is used to set a priority for discarding the packet. Packets that only slightly exceed the contract rate are assigned relatively low "discard eligibility" values, while packets that greatly exceed the maximum rate are assigned high discard eligibility values. In the event that it becomes necessary to drop a particular packet, those with higher discard eligibility values are more likely to be dropped than those with lower discard eligibility values.

Several approaches have been employed to monitor data flow rates on multiple links having multiple classes of service. One common approach is referred to as a "leaky bucket" approach. Under this approach, a memory or register storage location, commonly referred to as a "bucket," is allocated to each link and class of service. Each storage location or bucket maintains a count of a number of data units received for its assigned link and class of service. A data unit can be a byte of data, or a group of data bytes for example, where each data packet transfers multiple bytes of data. For each bucket, a predetermined threshold number of data units, related to the maximum allowable data rate for the associated link and class of service, is generated and stored. As a data packet is received, the number of data units (bytes) is added to the present value or count in the bucket, and the updated value is compared to the threshold. If the updated value exceeds the threshold, then the incoming data packet is marked as exceeding the threshold. Because it is data rates that are being policed rather than the total amount of data received, the value or count stored in each bucket is periodically decremented a predetermined number of data units related to the maximum allowable data rate and the period at which the decrementing takes place. This decrementing is commonly referred to as "leaking" the bucket. By leaking the bucket at the correct predetermined rate, it is ensured that when the number of data units in the bucket exceeds the predetermined threshold, the maximum allowable data rate has been exceeded.

In order to identify short bursts of large amounts of data that exceed the maximum allowable data rate, it is desirable to leak each bucket and perform a threshold comparison as often as possible. Such short bursts can be missed where buckets are not leaked and checked often enough. In relatively small systems, having a relatively small number of buckets, the system can cycle through all of the buckets relatively quickly such that short bursts of large amounts of data can be identified as being out of contract. In such systems, the buckets take the form of memory locations and the leaking and checking is performed in the system software. However, as systems become larger with larger numbers of links and classes of service and, consequently, larger numbers of buckets, the leaking and checking periods for each bucket become longer. Thus, the buckets are not maintained as frequently, and the likelihood of not identifying short large data bursts increases. Thus, the data rate policing in such systems becomes less accurate.

SUMMARY OF THE INVENTION

The present invention is directed to an apparatus and method for monitoring or policing data traffic at a network node which facilitates data transfer on at least one link having at least one class of service. The data are transferred in data packets, and each data packet includes at least one unit of data. For each of at least one selected link and class of service, an updatable value is stored in a storing device. A counter value in a counter is incremented at a rate determined by a maximum allowable data rate associated with the selected link and class of service. A data packet is received and a number of units of data in the data packet is counted. An adjusted updatable value is computed by adjusting the updatable value according to the counter value at the time the data packet was received and the number of units of data in the data packet. The adjusted updatable value is compared to a predetermined threshold associated with the selected link and class of service. The data packet is marked with respect to the allowable data rate based on whether the adjusted updatable value exceeds the predetermined threshold.

In one embodiment, the adjusted updatable value is computed by computing a difference between the updatable value and the counter value when the data packet was received. Next, that computed difference can be added to the number of units of data in the received data packet to compute the adjusted updatable value. In one embodiment, the adjusted updatable value is used to update the updatable value, such as by adding the adjusted updatable value to the number of units of data in the data packet and storing the resulting sum back in the storing unit as the updated value.

In one embodiment, each link can include multiple classes of service, and each class of service can have a unique allowable data rate. As a result, the storing device can include multiple individual storage areas. For example, the storing device can be a semiconductor memory, such as a static random access memory (SRAM), having multiple addressable locations. Therefore, the storing device stores a plurality of updatable values for each of a plurality of links and/or a plurality of classes of service.

In one embodiment, each data packet is associated with a discard eligibility value, which identifies a priority for discarding the data packet. In general, packets assigned higher discard eligibility values are more likely to be discarded if it is determined that discard is necessary for reasons such as excess data traffic or congestion. Therefore, in the present invention, data packets can be marked according to whether they cause a threshold to be exceeded by altering the discard eligibility value for the packet. That is, if a packet causes a threshold to be exceeded, the discard eligibility can be increased such that the priority for discard of the packet is increased.

In one embodiment of the invention, a link and class of service can be assigned multiple predetermined thresholds such that the discard eligibility value can be set to one of multiple corresponding levels, depending upon which of the thresholds are exceeded. In one embodiment, additional storing devices are provided to allow for multiple-stage policing such that multiple discard eligibility levels can be assigned. Where a second storing device is provided, a second updatable value associated with the selected link and class of service is stored in the second storing device. A second adjustable updatable value is computed according to the counter value at the time the data packet was received and the number of units data in the data packet. The second adjusted updatable value is compared to a second predetermined threshold associated with the selected link and class of service, where the second predetermined threshold is chosen to identify a second level of discard eligibility for packets. The incoming data packet is marked with respect to the allowable data rate based on whether the second adjusted updatable value exceeds the second predetermined threshold. In one embodiment, data packets are analyzed with respect to the second and other further stages if the packet is found to cause the first predetermined threshold to be exceeded.

Hence, in the present invention, a single counter is effectively used to effectively decrement the values stored in all of the "buckets" simultaneously. This single counter can be applied to counter derivation circuitry to derive counter values for any number of the buckets for any number of the links and classes of service. In the present invention, the processing stages, the buckets, which can be implemented as semiconductor SRAM memories, the counter and counter derivation circuitry can all be implemented in hardware. As a result, periodic round-robin decrementing or "leaking," as found in prior leaky bucket systems, is eliminated. Bucket values can be decremented and checked over extremely small time intervals such that large bursts in short time periods can be identified. The result is a much more precise and accurate policing approach than was found in prior systems. Because of the high precision of the policing approach of the invention, it can be applied in very large systems having large numbers of links and classes of service.

The invention is applicable in various networks in which it is desirable to monitor data traffic on links. For example, the invention can be implemented in a switching node such as the one described in co-pending U.S. patent application Ser. No. 09/108,771, filed on Jul. 2, 1998, entitled "System and Method for Switching Packets in a Network," by Schwartz, et al., and assigned to the same assignee as the present application. The contents of that application are incorporated herein in their entirety by reference.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

Figure 1:
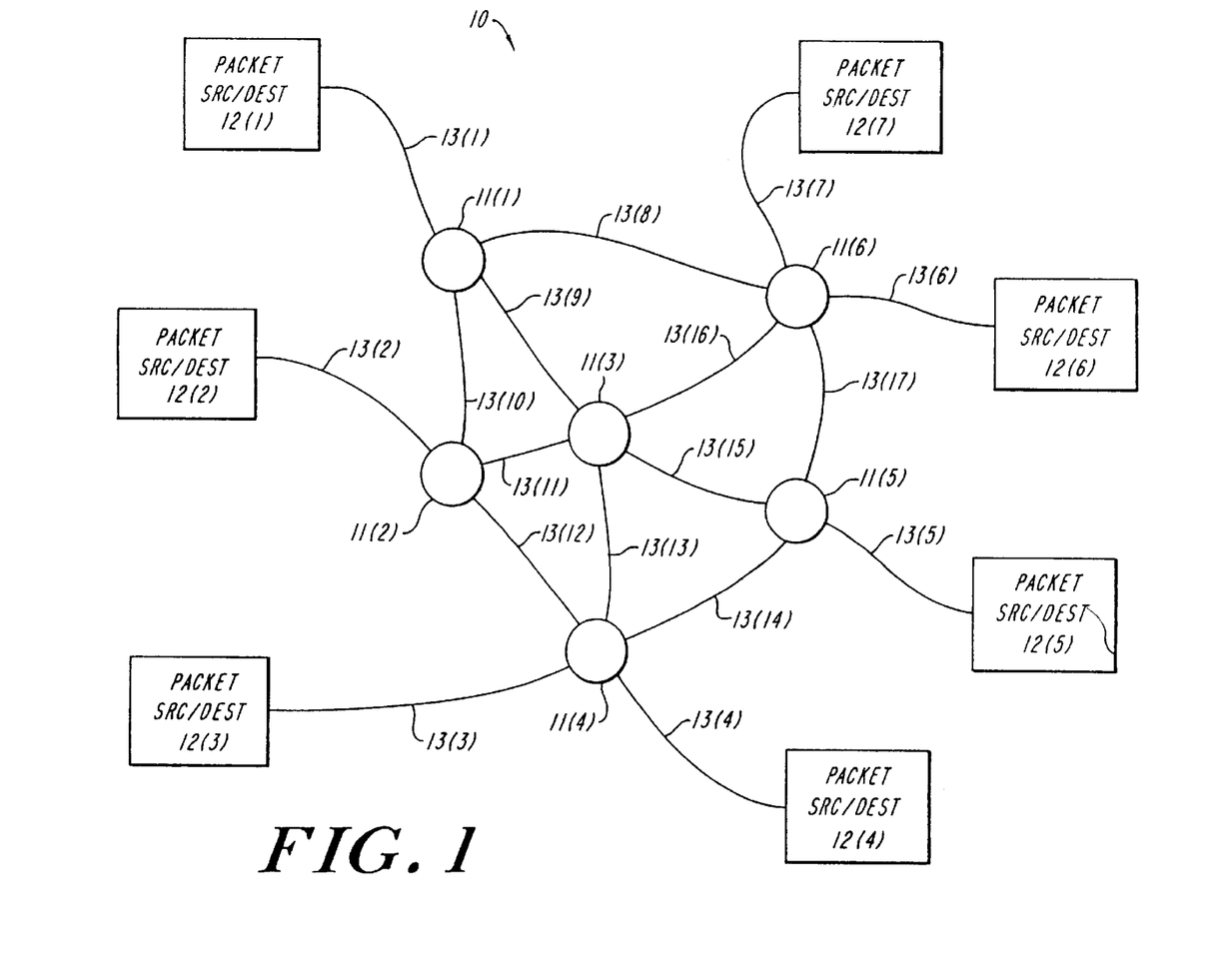
FIG. 1 contains a schematic diagram of a computer network including a plurality of switching nodes in accordance with the present invention.

FIG. 1 schematically depicts a computer network 10 including a plurality of switching nodes 11(1) through 11(N), generally identified by reference numeral 11, for transferring signals representing data among a number of devices, which in FIG. 1 are represented by packet source/destination devices 12(1) through 12(M), generally identified by reference numeral 12, in a wide area network ("WAN"). The packet source/destination devices 12, as is conventional, include a particular device such as a computer system or other device that stores, generates, processes or otherwise uses digital data, a local area network of such devices, or the like (not separately shown) to the wide area network 10. Each packet source/destination device 12 is connected over a communication link, generally identified by reference numeral 13, to a switching node 11 to facilitate transmission of data thereto or the reception of data therefrom. The switching nodes 11 are interconnected by communication links, also generally identified by reference numeral 13, to facilitate the transfer of information among the switching nodes 11(n). The communication links 13 may utilize any convenient information transmission medium, including, for example, wires for carrying electrical signals, optical fiber links for carrying optical signals, and so forth. Each communication link 13 is preferably bi-directional, allowing the switching nodes 11 to transmit and receive signals among each other and with customer premises equipment 12 connected thereto over the same link; depending on the particular type of medium selected for respective communication links 13, multiple media may be provided for transferring signals in opposite directions thereby to provide the bidirectional link.

Data are transferred in the network 10 in the form of packets. Generally, a packet includes a header portion and a data portion. The header portion includes information that assists in routing the packet through the network, with the specific information depending on the particular packet routing protocol that is used in routing packets through the network. In connection with network 10, any of a number of well-known packet routing protocols may be used; in one embodiment, the well-known Internet protocol ("IP") is used. In any case, the header typically includes address information including a source address identifying the particular source device $12(m_s)$ that generated the packet and a destination address identifying the particular destination address $12(m_D)$ that is to receive the packet. In the IP protocol, a packet may be of variable length and the header typically will also include length information to identify the length of the packet. Typically, the packet length is identified as a number of bytes or a number of groups of bytes, where a group of bytes contains a predetermined number of bytes. The header also typically includes other information, including, for example, protocol identifier information that identifies the particular protocol that defines the structure of the packet. The data portion contains the data payload of the packet. The packet may also include, as part of the data portion or otherwise, error detection information that can be used to determine whether an error occurred in transferring the packet.

A source device $12(m_s)$, after generating a packet for transfer to a destination device $12(m_D)$, provides the packet to the switching node 11(n) to which it is connected. The switching node 11(n) uses the destination address in the packet to attempt to identify a route, which associates a destination address with one of the communication links 13 connected to the switching node over which it is to transfer the packet to forward the packet to either the destination device $12(m_D)$, if the switching node 11(n) is connected to the destination device $12(m_D)$, or to another switching node 11(n') (n'≠n) along a path to the destination device $12(m_D)$. If the switching node can identify a route for the received packet, it will forward the packet over the communication link identified by the route. Each switching node 11(n), 11(n''), . . . that receives the packet will perform a similar operation. If all of the switching nodes have respective routes for the destination address, the packet will eventually arrive at the destination device $12(m_D)$.

Figure 2:
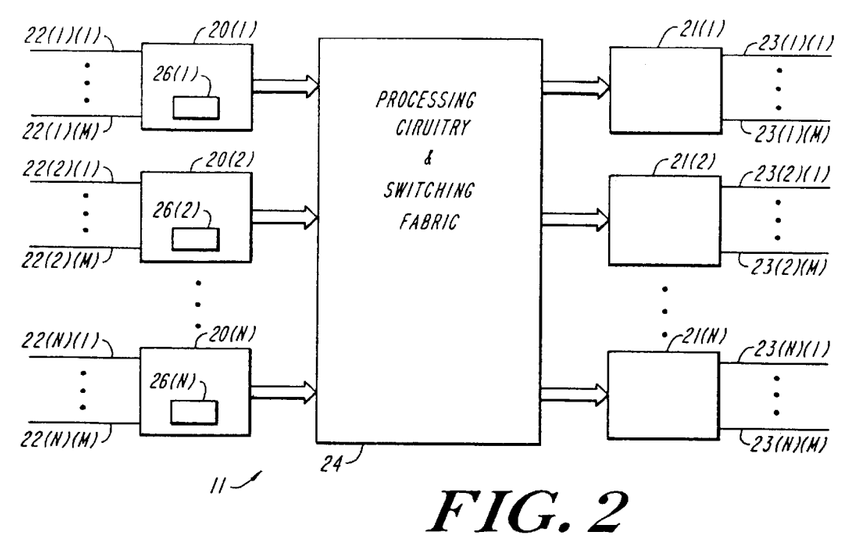
FIG. 2 contains a schematic block diagram of a switching node in accordance with the present invention.

FIG. 2 is a schematic block diagram of one embodiment of a switching node 11 in accordance with the present invention. The node 11 in general includes multiple input modules 20(1), 20(2), . . . ,20(N), generally referred to by reference numeral 20, and corresponding output port modules 21(1), 21(2), . . . ,21(N), generally referred to by reference numeral 21. The input port modules 20 and output port modules 21 are connected to processing circuitry and switching fabric 24 which controls forwarding of data from the input modules 20 to the output modules 21. In general, each input port module 20(n) can include one or more input ports 22(n)(1) through 22(n)(M), which can be connected to multiple communication links 13(n)(1) through 13(n)(M), respectively. Likewise, each output port module 21(n) can include one or more output ports 23(n)(1) through 23(n)(M) which can in general be connected to multiple communication links 13(n)(1) through 13(n)(M), respectively. Data received on each of the links 13(n)(m) are forwarded from the corresponding input module 20(n) across the processing circuitry and switching fabric 24 to the appropriate output module 21(n) and out onto the network on the appropriate link 13(n)(m).

Each of the links 13 can be assigned one or more classes of service and one or more customers that use the link. The data traffic initiated on each link can be monitored by the data monitoring or data policing circuitry 26 of the invention. In general, each input module 20(1), 20(2), . . . ,20(N) includes corresponding policing circuitry 26(1), 26(2), . . . ,26(N) in accordance with the invention. It should be noted that the policing circuitry 26 need not be located in the input modules 20. Alternatively, or additionally, policing circuitry can be located in the processing circuitry and switching fabric 24 and/or the output modules 21. It should also be noted that the above network node configuration is intended as an illustration only in which the invention is applicable to a node structure that includes input/output modules supporting multiple links connected by a separate processing and switching fabric. It will be understood that the present invention can be used with other node structures, including but not limited to nodes without input and/or output modules and/or separate processing and switching fabrics, as well as nodes that support single input and/or output links.

Figure 3:
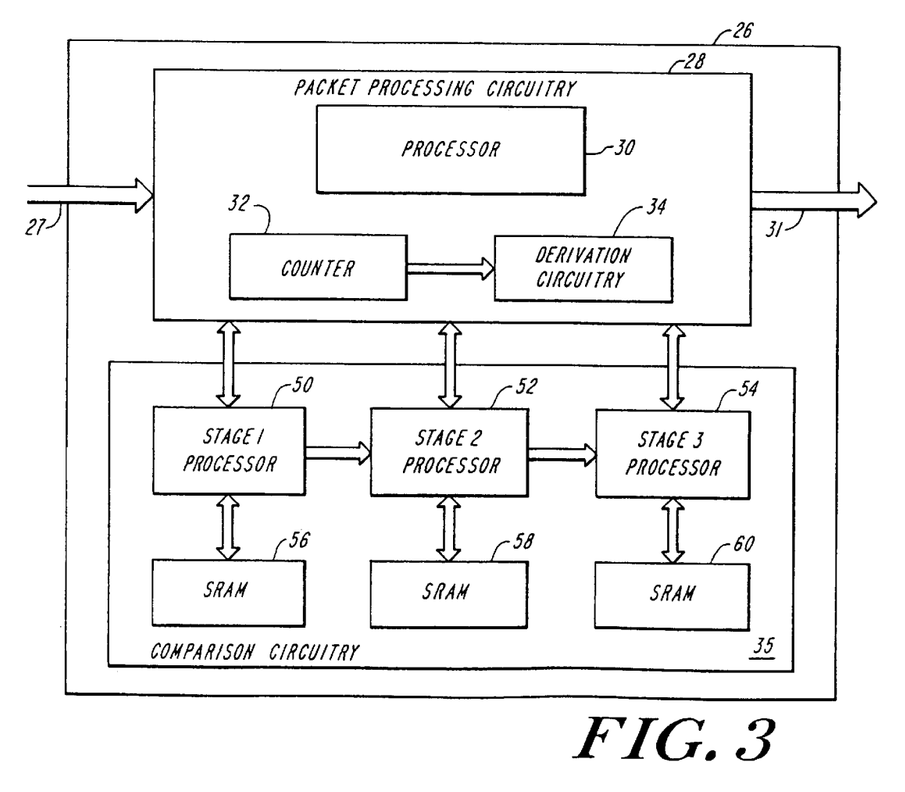
FIG. 3 contains a schematic block diagram of one embodiment of data flow monitoring circuitry in accordance with the invention.

FIG. 3 contains a schematic block diagram of one embodiment of policing circuitry 26 in accordance with the invention. As shown in FIG. 3, data packets are received at the policing circuitry 26 on lines 27. The packets are processed by packet processing circuitry 28 and are output on lines 31.

Figure 4:
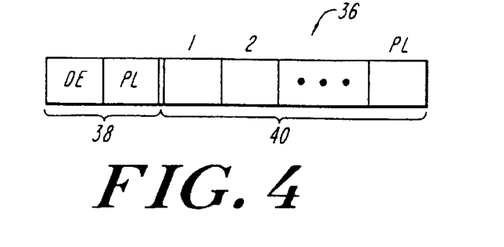
FIG. 4 contains a schematic diagram of a data packet which can be processed in accordance with the invention.

FIG. 4 contains a schematic diagram which illustrates some of the fields contained in a typical data packet 36. The packet 36 includes a header portion 38 and a data portion 40. A typical header includes a discard eligibility (DE) field and a packet length (PL) field. The DE field includes a DE value which sets the priority for discard of the packet. The PL value is the number of units of data in the data portion 40 of the packet 36. Typically, a unit of data is a byte such that the packet length PL value is the number of bytes in the data portion 40. In other systems, the packet length is a number of groups of bytes. For example, in one particular system, bytes are packaged in groups of 32, and the packet length value is the number of 32-byte groups in the data. For example, in such a system, a packet length of PL equal to 32 corresponds to 32 groups of 32 data bytes, i.e., 1024 bits (1 k) of data.

The packet processing circuitry 28 receives a packet 40 and reads values for DE and PL from the packet. These initial values are passed to the comparison circuitry 35 along with the identity of the link on which the packet was received and the class of service associated with the packet. The comparison circuitry 35 performs comparison processing as described below in detail to determine whether the packet causes an allowable data rate on the identified link at the identified class of service to be exceeded. In one embodiment, the comparison circuitry 35 adjusts the DE value of the packet according to whether one or more predetermined thresholds assigned to the link and class of service are exceeded. The processor 30 then reassembles the packet with the new DE value and forwards the packet out of the policing circuitry 26 on lines 31.

The comparison circuitry 35 contains circuitry used to determine whether a particular packet causes an allowable data rate on a link to be exceeded. In the illustrated embodiment, it also can define the level to which the rate is exceeded and assign a DE value based on that level.

In the embodiment shown in FIG. 3, three stages of processing are used to compare a number of units of data, e.g., bytes or groups of bytes, that have been received over a particular link at a particular class of service to three predetermined threshold values. The three processing stages allow for four levels of classification of the degree to which the threshold is exceeded. Consequently, the system allows for four possible settings of the DE value associated with the packet being examined.

In this embodiment, the circuitry 35 includes a first stage processor 50, a second stage processor 52 and a third stage processor 54. Each of the three processors 50, 52, 54 interfaces with a memory 56, 58, 60, respectively, each of which, in one embodiment, is a SRAM memory. Each memory has allocated a memory location or group of locations to each link and class of service being policed. These locations or groups of locations, i.e., "buckets," maintain an updatable value which can be updated upon receipt of a packet of data. Each memory 56, 58, 60 also stores the predetermined threshold for each link and class of service to which the corresponding updatable value is compared upon receipt of a new data packet.

In one embodiment of the invention, the stage 1 processor 50 performs a first comparison step using the bucket value stored in the first memory 56 and its corresponding threshold. If the threshold is exceeded, the DE value is incremented for the packet and the processing proceeds to the second stage. The second stage processor 52 can then perform a second comparison using the corresponding bucket value stored in memory 58 and its associated threshold. If the threshold is exceeded, the DE value can again be increased, and processing can be proceed to the third stage processor 54. If the second stage threshold is not exceeded, the present DE value at stage two can be stored back with the data packet by the processor 30 in the packet processing circuitry, and the packet with the updated DE value can be passed out of the policing circuitry 26. The third stage processor 54 can be used to perform the comparison to again increment the DE value for the packet, if needed. At any stage, if a threshold is not exceeded, the present DE value is stored back with the packet by the processor 30, and the packet is transmitted out of the policing circuitry 26 with the updated DE value.

In another embodiment, if at any stage a threshold is not exceeded, processing proceeds to the next stage regardless. The DE can be incremented if the threshold is exceeded and left unchanged otherwise. Alternatively a separate DE flag for each stage can be carried with the packet, and these flags combined by circuitry after all stages have completed their comparisons.

As shown in FIG. 3, the packet processing circuitry 28 also includes a counter 32 and counter value derivation circuitry 34. In one embodiment, the counter is a free-running counter which is incremented at a predetermined periodic rate. The derivation circuitry 34 can be used to derive counter values that are incremented at any of a number of predetermined rates. The various counter values thus generated can be used by the comparison circuitry 35 as described below in detail to determine whether data packets received on the various links and at the various classes of service have caused allowable data flow rates to be exceeded. It will be noted that throughout this description, where a counter value is referred to, it need not be the value stored in the actual counter 32. The value can be one of the values generated by the derivation circuitry 34. It should also be noted that instead of using a single counter with derivation circuitry, multiple counters can be used with or without derivation circuitry.

Figure 5:
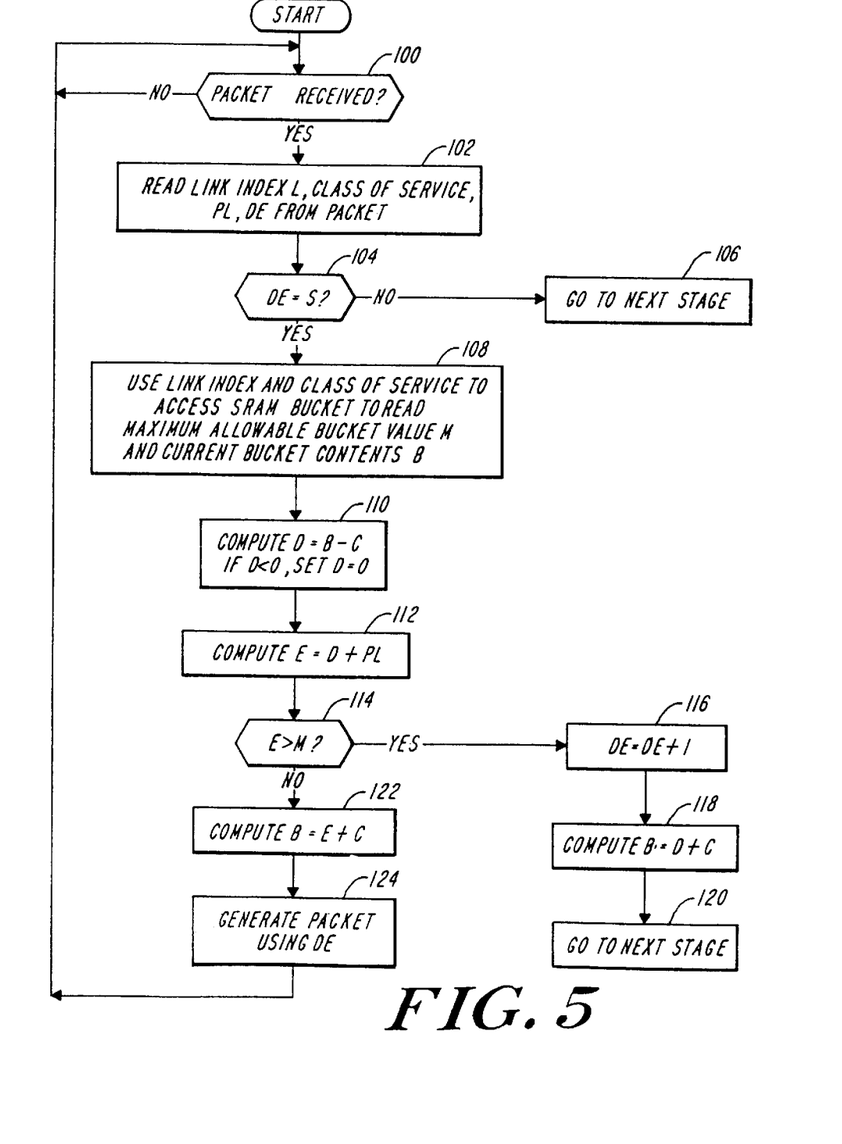
FIG. 5 contains a schematic flow diagram which illustrates the logical flow of one embodiment of the data flow monitoring approach of the invention.

FIG. 5 is a schematic flow diagram illustrating the logical flow of one embodiment of the data flow policing approach of the invention. The data flow policing approach of the invention will now be described in detail in connection with FIGS. 3 and 5. As illustrated by step 100, the packet processing circuitry 28 waits for a packet to be received. When a packet is received, in step 102, the link index L, which identifies the link on which the packet was received, and the class of service for the link are read. The packet is also analyzed to read the packet length PL and the incoming discard eligibility DE for the packet. Next, this information is transferred to the first stage processor 50. It is first determined whether the present value of DE is equal to the discard eligibility associated with the stage S. If not, the present stage performs no processing on the packet, and flow continues to the next subsequent stage in step 106. If the DE value for the received packet is at the appropriate level for the present stage, then the link index L and class of service are used to access the appropriate memory location(s), i.e., "bucket," in the associated SRAM memory, which in the first stage is memory 56.

The maximum allowable bucket value (threshold) M and the current bucket contents value B are read from the SRAM 56 in step 108. In step 110, the difference D between the bucket contents B and the present counter value C is computed, i.e., $D=B-C$. This difference computation effectively decrements or "leaks" the bucket being examined. If the difference D is less than zero, then D is set to 0. In step 112, the packet length PL, which can be the number of bytes or number of groups of bytes in the data packet, is added to the difference D. This effectively computes a new adjusted bucket contents value E. In step 114, this adjusted value E is compared to the bucket threshold M. If E exceeds the threshold M, then the DE value for the packet is incremented in step 116. Next, in one embodiment, the bucket contents of the present stage are updated in step 118 by adding the counter value to the difference D and storing that sum back in the SRAM 56 as the new bucket value B associated with the link index L and class of service of the received packet, i.e., B=D+C. In an alternative embodiment, the bucket contents are updated by adding as many data units to the bucket contents as can be added without exceeding the threshold, i.e., B=M. Next, in step 120, the process advances to the next subsequent stage, in this case, stage 2, where the comparison process is performed to determine whether the incoming packet causes to the stage 2 threshold M to be exceeded. Referring again to step 114, if the value E does not exceed the value M, then, in step 122, the bucket contents are updated by adding the counter value C to the sum E and storing that value back in the bucket location as the new value B for the bucket contents, i.e., B=E+C. Next, in step 124, the packet is regenerated by the packet processing circuitry 28 using the present value for DE. The packet is then forwarded out of the packet processing circuitry 28 on lines 31. Flow then returns to the beginning where another packet can be received.

This process is performed at each stage with the value DE being incremented at each stage in which a threshold M is exceeded. The packet is finally reassembled with the new DE value altered by the policing circuitry of the invention. Where none of the thresholds are exceeded, the DE value of the packet remains unchanged.

Because the counter, the counter derivation circuitry and bucket locations are of finite sizes in bits, at any time, the difference between the bucket value and the counter value could be ambiguous if the time since the last bucket update is long, due to wrap-around or underflow. In the present invention, this problem is resolved by using a "scrubbing" approach in which zero-length packets are introduced into the system periodically to bring the underflowing buckets back into a valid range. These zero-lengths packets are used to reset individual buckets and, therefore, are encoded with specific link indices L and classes of service, in similar fashion to the encoding of actual packets.

Following the approach described above in connection with FIG. 5, when a zero-length packet is received, its link index L and class of service are read. These values are used to retrieve the threshold value M and the current bucket contents B. The difference D=B−C is computed, and D is set to zero since, in the underflow situation, the counter value will exceed the bucket value B. Next, the sum E=D+PL=0 is computed. Upon comparison to the threshold M, it is determined that the threshold M is not exceeded. A new bucket value B=E+C=0+C=C is computed, which effectively sets the new bucket value B at the counter value C. Hence, using a zero-length packet, the bucket contents are set to the present counter value, which effectively zeroes out the bucket. In the case of a scrubbing operation in which no bucket underflow has occurred, the current bucket contents B are left unchanged.

Thus, according to the foregoing description of the invention, the counter 32 and derivation circuitry 34 are accessible by all of the processing stages and all of the buckets in a very small time frame. In fact, in the time frame defined by the reception and forwarding of data packets, the buckets can be updated and checked virtually instantaneously. Hence, within that time frame, the many buckets can be effectively checked and updated almost simultaneously. This is a vast improvement over the prior round-robin approaches found in conventional leaky bucket processes. As a result, the "leaking" granularity in the present invention is much finer than that in the conventional systems. Therefore, the threshold value M can be set at a very low level to accurately police data flow. In fact, using the above described process, the threshold M can be set so low that even a single data packet with enough data to exceed the allowable limit can be marked as out of contract. In practical applications, such a threshold would not be used since it would prevent any bursts of data from being forwarded. In actuality, because of the flexibility provided by the present approach, the threshold value M can be set to allow for a predetermined level of tolerable "burstiness" of data traffic on the link. Thus, a very precise and accurate policing and monitoring approach is provided with great flexibility in controlling traffic on the link.

In actual network environments, data packets can include very large amounts of data. For example, it is not uncommon for more than a kilobyte of data to be transferred in one packet. In some common systems and protocols, to accommodate the large amounts of data and to reduce the complexity involved in processing large numbers, amounts of data are quantized such that they are specified in terms of groups of bytes. For example, in one particular approach, data are quantized and counted in 32-byte groups. As a result, the packet length (PL) value for data packets, which typically is given in bytes, is processed to identify a number of 32-byte units. Typically, this involves eliminating the five least significant bits (LSBs) of the PL word. In conventional systems, this is done by a rounding function. Where the five LSBs of the PL word represent a number from $0_{10}$ to $15_{10}$, the new processed value, representing the number of 32-byte units, is rounded down. Where the five LSBs represent a number from $16_{10}$ to $31_{10}$, the processed value is rounded up.

In actual systems, there are some packet lengths that are more common than others. As a result, the five LSBs of the PL word of received packets are not evenly distributed from $0_{10}$ to $31_{10}$. This uneven distribution can result in significant error when the conventional rounding function is used. In the present invention, a more random rounding function is used. In the present invention, the value of the five LSBs is compared to a randomly generated number between $0_{10}$ and $31_{10}$. Where the value of the five LSBs is greater than or equal to the randomly generated threshold, the number of 32-byte units is rounded up. Where the value of the five LSBs of the PL value is below the randomly generated threshold, the number of 32-byte units is rounded down. This results in a more evenly distributed rounding function which serves to eliminate error from the process.

Figure 6:
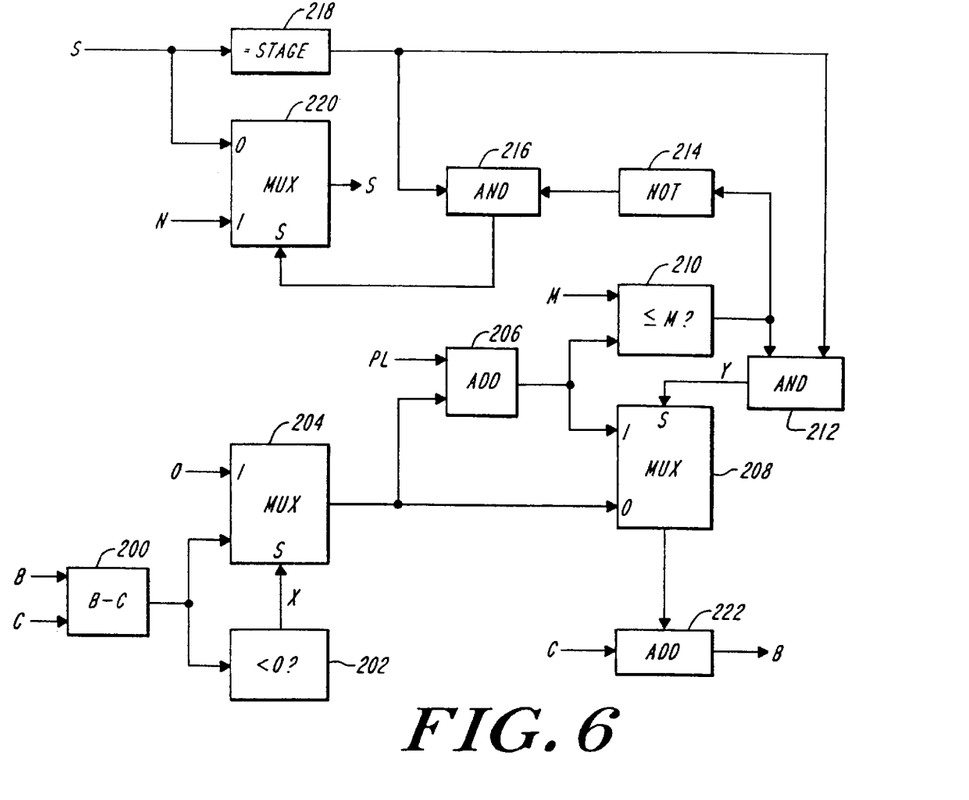
FIG. 6 contains a schematic functional block diagram which illustrates one embodiment of the data rate monitoring apparatus and method of the invention.

FIG. 6 contains a schematic functional block diagram which illustrates one embodiment of the data rate monitoring apparatus and method of the invention. As shown in FIG. 6, in block 200, the difference D between the current bucket contents B and the counter value C is computed, i.e., D=B−C. The difference is passed to a comparison block 202 which determines whether the difference D is less than zero. If D is less than zero, then the MUX 204 is controlled by the select line (labeled "x") out of the comparison block 202 to pass the value 0 as its output. Otherwise, the difference D is passed out of the MUX 204.

The packet length PL of the incoming packet is added to the difference D in a summing block 206 to generate the sum E=D+PL. The difference D is also passed to an input of a second MUX 208. The sum generated in block 206 is applied to a second input of the MUX 208. The sum is also applied to a second comparison block 210 which determines whether the sum is less than or equal to the predetermined threshold M. The output of the block 210 is a logical signal which is active (high) when the sum computed in block 206 is less than or equal to the threshold M and inactive (low) when the sum exceeds the threshold. That logical value is applied to a first input of a logical AND block 212 and is also applied to an inversion circuit 214. The inverted value is applied to one input of a second AND block 216. The second input to the AND block 216 is generated from a comparison block 218 which determines whether the current S value, which identifies the current discard eligibility (DE) for the packet, is equal to that of the current processing stage. If it is, and the threshold M is determined to be exceeded in block 210, then the logical AND block 216 outputs an active signal to the select line of MUX 220 such that the value N of the next stage is output as a new value for S. That is, processing moves to the next stage. The N value is a hard-coded value with the index of the next stage in the pipeline.

The result of the comparison at block 218 is also input to the logical AND block 212. If the current stage is correct and the threshold is not exceeded, then the logical AND 212 applies an active signal to the select line of MUX 208 such that the sum E=D+PL computed in block 206 is output to an adder unit 222. The adder 222 adds the output of MUX 208 to the counter value C and stores it back as a new updated bucket contents B, i.e., B=E+C.

If either the stage is not correct, i.e., comparison block 218 has an inactive output, or the threshold M is determined to be exceeded in block 210, then the select line of MUX 208 (labeled "y") is driven low by AND block 212 such that the difference D=B−C is passed to the adder block 222. As a result, the counter value is added back to the difference D such that the bucket contents B remain unchanged.

As mentioned above, the scrubbing operation which avoids the wrap-around aliasing problem is implemented as periodic dummy packets with arbitrary and unused PL length value, with S set to binary 11, and with L set to a value from a counter which increments for each scrub operation. The S value then causes each pipelined stage to reset its bucket to the current counter value if the bucket has underflowed.

In one embodiment of the invention, substantial processing time can be eliminated by pre-calculating certain values before the process reaches the adding step 222 in which the bucket contents B are modified. Table (1) lists the values that can be calculated by the data path logic illustrated in FIG. 6.

TABLE 1

| Calculated | Equivalent | Notes |
|---|---|---|
| C | | (when x = 1, y = 0) |
| C + B − C | (B) | (when x = 0, y = 0) |
| C + B − C + PL | (B + PL) | (when x = 0, y = 1) |
| C + PL | | (when x = 1, y = 1) |
| B − C < 0 | | (becomes x) |
| PL ≦ M | (PL − M − 1 < 0) | |
| B − C + PL ≦ M | (B − C + PL − M − 1 < 0) | |
| S = stage | | |

Figure 7A:
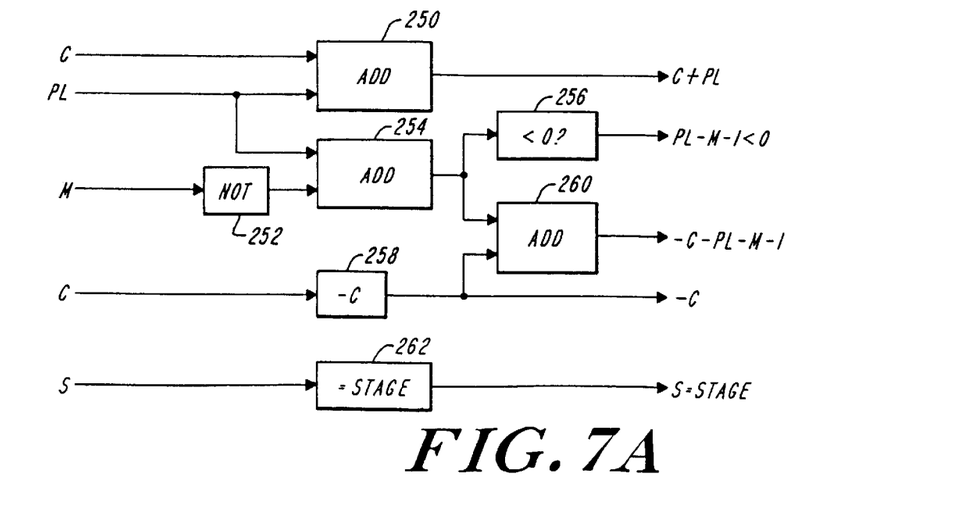
FIG. 7A contains a schematic block diagram of one embodiment of a first calculation substage in accordance with the invention.
Figure 7B:
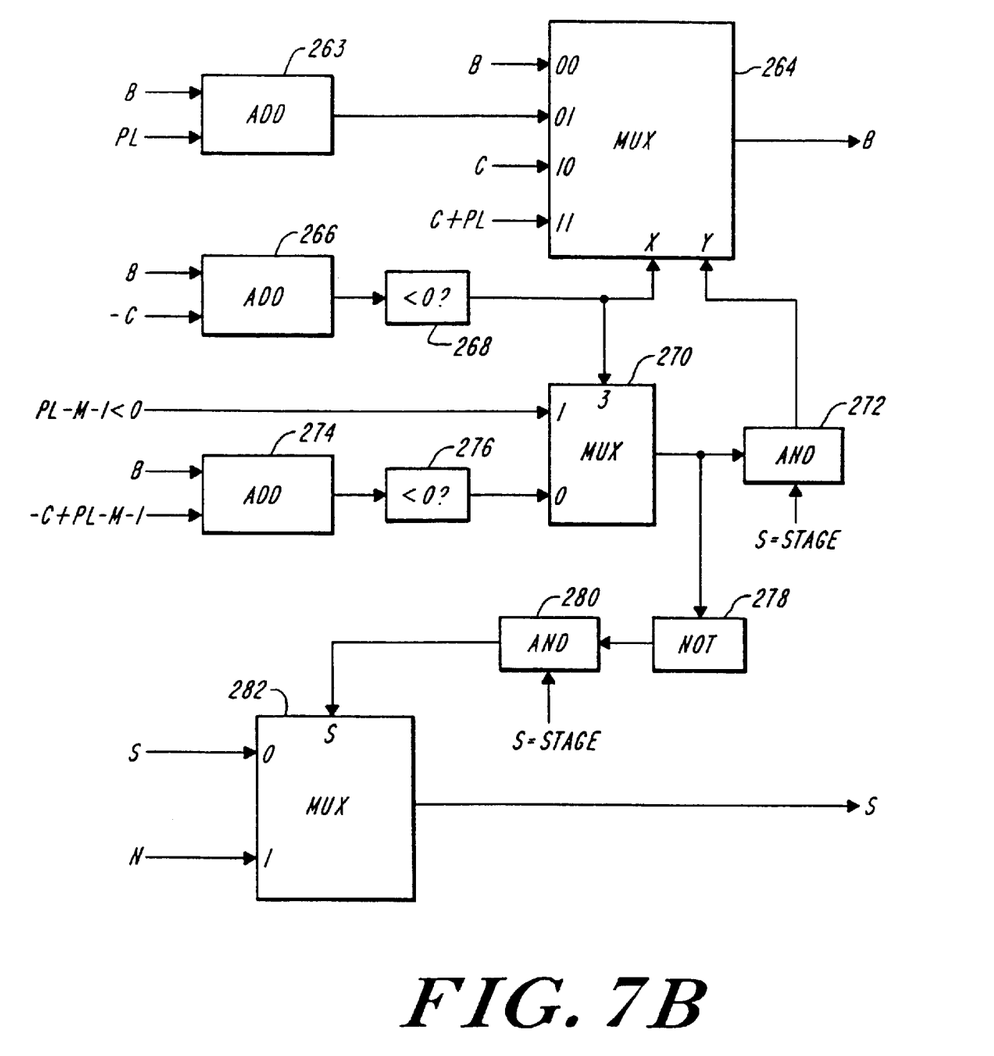
FIG. 7B contains a schematic block diagram of one embodiment of a second calculation substage in accordance with the invention.

It is noted that only the value B is required to be read and written within a single stage and that all the other values (including M) can be pre-calculated before reaching the B-modifying stage in block 222 of FIG. 6. As a result, computations can be performed in substages to reduce computation time. In one embodiment, the computation can be performed in two substages. FIG. 7A is a schematic block diagram of a first substage, referred to herein as "substage A," and FIG. 7B is a schematic block diagram of a second substage referred to herein as "substage B". As shown in FIG. 7A, the sum C+PL is computed by adding block 250. The threshold M is inverted by inversion block 252, and the sum of the inverted M and the value PL is computed in adding block 254. Comparison block 256 determines whether PL−M−1 is less than 0. The value C is negated in inversion block 258, and the sum computed in adding block 254 is added to −C in block 260. The value of S is set to the stage number in block 262. These values in substage A illustrated in FIG. 7A are applied to substage B, which is illustrated in FIG. 7B.

As shown in FIG. 7B, the values B, B+PL, C and C+PL are applied to the inputs of a MUX 264 which outputs the selected input as updated bucket contents B. The select lines x and y of the MUX 264 are generated according to the following description. The sum of B and −C is computed in adder 266, and that sum is compared to 0 in comparison circuit 268. The logical output of the comparison circuitry 268 is applied to the MUX 264 as select line x. With the sum computed in block 266 is less than zero, then the select x is active. If the sum computed in block 266 is greater than or equal to zero, then the select line x is inactive. The value of select line x is also applied to the select line of a MUX 270. If the select line is active, then the logical value of the relation PL−M−1<0 is passed to the output of MUX 270. If the select line x is inactive, then the logical value of the relation B−C+PL−M−1<0, which is generated by adding block 274 and comparison block 276, is passed through the output MUX 270.

The output of MUX 270 is applied to a logical AND block 272 along with the value of S. The output of the AND block 272 is the select line y for MUX 264. The output of MUX 270 is also negated by inversion circuitry 278. The inverted value out of block 278 is applied to logical AND circuit 280 along with the value of S. The output of the AND block 280 is used as a select line for another MUX 282. The MUX 282 selects either S or N to be output as the updated value for the variable S.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of monitoring data traffic at a node on a network, the node facilitating data transfer on at least one link having at least one class of service, the data being transferred in data packets and each data packet including at least one unit of data, said method comprising:

for each of at least one selected link and class of service, storing an updatable value in a storing device;

incrementing a counter value in a counter at a rate determined by an allowable data rate associated with the selected link and class of service;

receiving a data packet;

counting a number of units of data in the data packet;

computing an adjusted updatable value by adjusting the updatable value according to the counter value when the data packet was received and the number of units of data in the data packet;

comparing the adjusted updatable value to individual ones of a set of predetermined thresholds associated with the selected link and class of service; and assigning a discard eligibility to the data packet according to which threshold is exceeded, if any.

2. A method of monitoring data traffic at a node on a network, the node facilitating data transfer on at least one link having at least one class of service, the data being transferred in data packets and each data packet including at least one unit of data, said method comprising:

for each of at least one selected link and class of service, storing an updatable value in a storing device;

incrementing a counter value in a counter at a rate determined by an allowable data rate associated with the selected link and class of service;

receiving a data packet;

counting a number of units of data in the data packet;

computing an adjusted updatable value by adjusting the updatable value according to the counter value when the data packet was received and the number of units of data in the data packet;

comparing the adjusted updatable value to individual ones of a set of predetermined thresholds associated with the selected link and class of service;

associating a discard priority with each threshold; and computing a single discard priority for the data packet according to which thresholds are exceeded and the priorities associated with the thresholds.

* * * * *